July 31, 1934.    J. LEDWINKA    1,968,531
VEHICLE ROOF CONSTRUCTION
Filed July 23, 1930

INVENTOR.
JOSEPH LEDWINKA.
BY
ATTORNEY.

Patented July 31, 1934

1,968,531

UNITED STATES PATENT OFFICE 1,968,531

VEHICLE ROOF CONSTRUCTION

Joseph Ledwinka, Philadelphia, Pa., assignor to Edward G. Budd Manufacturing Company, Philadelphia, Pa., a corporation of Pennsylvania Application July 23, 1930, Serial No. 470,116

5 Claims. (Cl. 296—137)

My invention relates to a vehicle roof structure and particularly to a metal frame roof structure adapted to be applied as a unit in the final assembly of the vehicle body.

It is a main object of my invention to provide such a roof structure, the frame of which is made of relatively simple and inexpensive construction adapted for ready assembly of the parts of the frame and its joinder to the body in the final assembly, and further adapted to permit the ready application of the upholstery and roof covering. These objects are attained in large part by making the parts of the frame of the roof of relatively simple stampings so shaped as to facilitate the joinder to each other by that simplified method of metal joinder, as by spot welding, and to provide in the stampings so formed, relatively deep channels within which the tacking strips for securing the upholstery and covering may be readily located and held in place.

Other and further objects and advantages will become apparent from the following detailed description when read in connection with the accompanying drawing, in which, Fig. 1 is a plan view of the metal roof panel with portion of the reticulated metal covering broken away.

Figure 1:
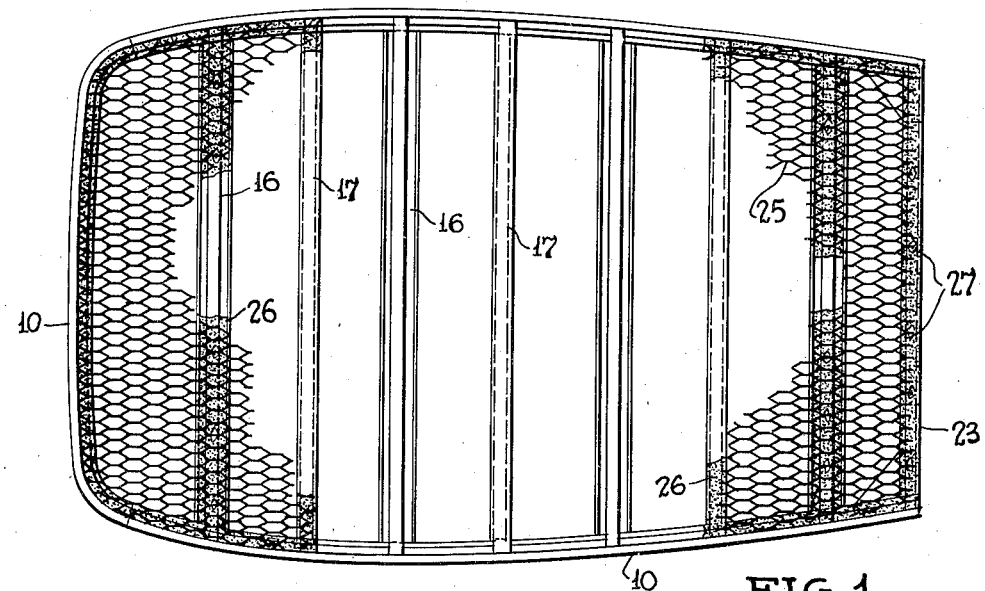
Figure 4:
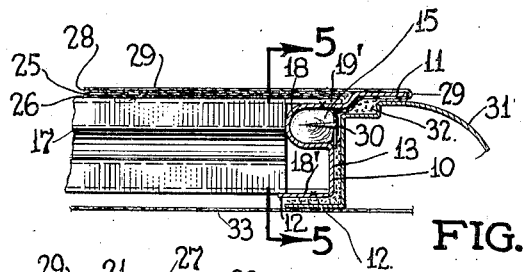
Fig. 4 is a transverse sectional view through the edge of the completely assembled roof panel unit showing the joint between it and the adjacent edge of the roof.

In the embodiment of my invention shown in the drawing, the frame of the roof unit is built of an edge member 10 extending around the sides and back of the roof either as a continuous one piece stamping or as several stampings butt-welded together to provide in effect a continuous unitary member. This member is of generally Z-shape in cross section having an outwardly extending upper arm 11, an inwardly extending lower arm 12, and a web portion 13 connecting said arms. The web portion is formed with an inwardly extending bead 18 adjacent the upper arm 11 which provides a deep relatively narrow outwardly facing channel 15, which not only adds strength to the member 10 but serves also for the attachment of cross members and the roof covering.

The cross members connecting the side portions of the edge members comprise stampings 16 and 17 of somewhat different cross section which alternate with each other. The stampings 16 are in the form of downwardly facing channels having edge flanges 14 forming with the side walls of the main channels of the stampings, shallow upwardly facing channels, this cross section providing a rigid and strong cross connection. The bottom wall of the channel is extended at its ends by extensions 19 which overlie the top walls of the inwardly extending beads 18 and are secured thereto as by spot welding. Since the channels are of substantially the depth of the beads, the bottom walls of the shallow channels formed by the flanges 14 may be similarly extended to overlap the under sides of the beads 18, for securement thereto, as by spot welding. The side walls of the channels abut the bottoms of the beads 18.

Thus it will be seen that a very rigid, strong and secure interconnection is provided between the side portions, of edge member 10 at the points of connection of the members 16 both against tensile and compressive and torsional strains.

The alternate cross members 17 are generally of channel section form with the bottom wall of the channel arranged vertically and abutting the bottoms of the beads 18 of the side portions of edge member 10, and their upper and lower side walls 18' and 19' are extended to overlap, respectively, the tops of the beads 18 and the lower arm 12 of the edge member 10 and are secured thereto as by spot welding. Thus again is provided a very secure interconnection between the side portions of the edge member 10 against compressive, tensile and torsional strains. The cross members 17 are further strengthened and reinforced by the provision of a deep relatively narrow bead 20 formed in the vertical bottom wall thereof, and providing a corresponding channel 21 facing in the opposite direction from the general channel shape of the cross member. This channel is similar to the channel 15 and made use of for receiving and holding in place the tacking strip 22 for securing the upholstery.

Figure 3:
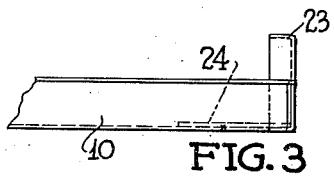
Fig. 3 is a side elevational view of the corner of the frame shown in Fig. 3 with the reticulated covering removed.

At the extreme front, the roof unit has the side portions of the edge member 10 connected by a cross member 23 of rearwardly facing channel section, the top and bottom side walls of which are extended and overlap in their extended portions respectively, the top of the inwardly extending bead 18 and the lower arm 12 of the edge member and are rigidly secured thereto as by spot welding. To additionally reinforce and secure these members in the corners, flat gusset plates 24 of generally triangular form may be welded to the bottom wall of the channel cross member 23 and the arm 12 of the side portions of edge member 10. The transverse members may be formed transversely, as indicated in Fig. 3, to the required curvature of the roof.

Figure 5:
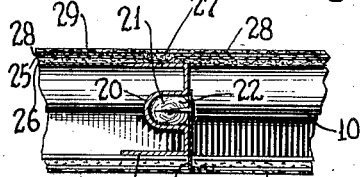
Fig. 5 is a detail sectional view taken substantially on the line 5—5 of Fig. 4.
Figures 2, 6:
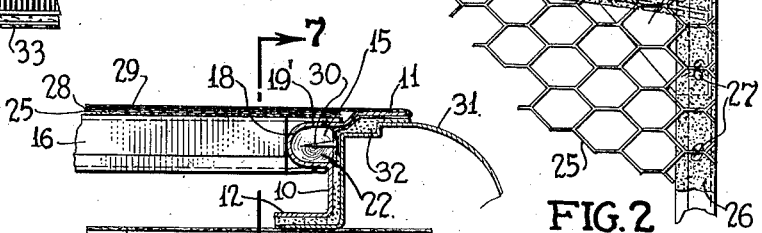
Fig. 2 is an enlarged detail view of a forward corner of the roof panel shown in Fig. 1.
Fig. 6 is a transverse sectional view similar to Fig. 4 but through another portion of the roof spaced longitudinally from the section of Fig. 4.
Figure 7:
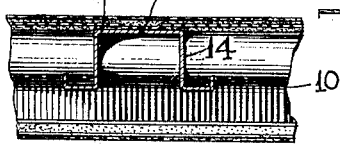
Fig. 7 is a sectional view similar to Fig. 5 but taken approximately on the line 7—7 of Fig. 6.

The metal roof frame so produced, made up of light gauge sheet metal stampings welded together, is extremely strong, rigid and durable, and yet very light in weight. The upper surfaces formed by the top of the inwardly extending bead 18 and the top walls of the channel section cross members form a substantially smooth surface against which the roof covering may be secured. To prevent sagging of the covering between frame members, the entire framework formed by members 10, 16, 17 and 23 is covered by the usual reticulated cover, such as the large mesh wire netting panel 25, and this can be readily and speedily secured to the tops of the metal frame members, because of the openness of the joints, by spot welding it thereto, as indicated in Fig. 2. The spot welding may be substantially continuous along the marginal members but at the intermediate cross members, sound deadening material, such as felt pads 26, may and preferably are, inserted between the wire netting and the frame members 16 and 17, this padding being cut away at spaced locations, as indicated at 27, in Figs. 5 and 7, and the wire netting is spot welded to the frame members in these locations.

Since the tops of the cross members and the top of the bead 18 are offset downwardly somewhat below the level of the outwardly extending edge flange 11, the application of the reticulated cover or wire netting 25 and the usual felt or other sound deadening padding 28, applied to the top of the wire netting provides with these lateral flanges 11 a substantially smooth surface over the entire roof over which the roof covering 29 may be stretched.

A tacking strip, as 22, which may be a flexible twisted cord of paper or other fibrous or yielding material is pressed into the channel 15, and frictionally held therein by its resiliency, or additionally, by tabs (not shown) formed in the metal of the members. Ordinarily, it is sufficient as there is no substantial pull on the tacking strip outwardly of the channel to rely on the frictional holding alone.

With the strip 22 so secured in place the covering 29 may be applied, its edges lapped back under the flange 11 and secured to the tacking strip by the tacks 30.

The substantially Z-section edge member 10 of the roof unit fits, in the final assembly, substantially similarly formed side and rear edge portions of the side and rear portions 31 of the roof, the space between being sealed by a suitable plastic weather proof material 32.

The channels 21 in the transverse frame members 17 are filled with tacking strips 22 similar to those in the channels 15 in the edge members, and the roof upholstery 33 is secured to these strips by nailing the tabs 34 sewed or otherwise secured thereto, to the tacking strips. Thus it will be seen that I have provided a very simple and light, yet strong, rigid and durable roof construction and one particularly adapted for the ready attachment of the covering and upholstery.

While I have herein described a particular construction by which the objects of my invention are achieved, it will be understood that changes and modifications may be made without departing from the spirit of the invention, and I propose to include such within the spirit and scope of the appended claims.

What I claim is:

1. A sheet metal roof frame for a central roof unit comprising side members of generally Z-section having a relatively deep vertical web, a top outwardly extending flange and a bottom inwardly extending flange and a channel pressed into the upper portion of the vertical web for receiving a tacking strip, the top of said channel continuing the outwardly extending flange inwardly in downwardly offset relation, and spaced transverse metallic frame members of generally channel cross section having one of their walls abutting the bases of the channels in the side members, and another of their walls extended over the top wall of the channels of the side members and secured thereto in the offset of the side members.

2. A sheet metal roof frame for a central roof unit comprising side members of generally Z-section having a relatively deep vertical web, a top outwardly extending flange and a bottom inwardly extending flange and a channel pressed into the upper portion of the vertical web for receiving a tacking strip, the top of said channel continuing the outwardly extending flange inwardly in downwardly offset relation, and spaced transverse metallic frame members of generally channel cross section having one of their walls abutting the bases of the channels in the side members, and another of their walls extended over the top wall of the channels of the side members and secured thereto in the offset of the side members, certain of said transverse members having the channel thereof presenting longitudinally and having formed in the bottom of the channel a relatively deep narrow channel for the reception of a tacking strip.

3. A sheet metal roof frame for a central roof unit comprising side members of generally Z-section having a relatively deep vertical web, a top outwardly extending flange and a bottom inwardly extending flange and a channel pressed into the upper portion of the vertical web for receiving a tacking strip, the top of said channel continuing the outwardly extending flange inwardly in downwardly offset relation, and spaced transverse metallic frame members of generally channel cross section having one of their walls abutting the bases of the channels in the side members, and another of their walls extended over the top wall of the channels of the side members and secured thereto in the offset of the side members, certain of said transverse members having the channel thereof presenting downwardly and the side walls flanged in their edges, the side walls of the channel abutting the bottom of the channel of the side members and the bottom wall of the channel and the flanges on the side walls being extended and being secured respectively to the top and bottom of said side member channels.

4. A roof structure for a central roof unit comprising sheet metal side and rear edge frame members and spaced connecting sheet metal frame members connecting the side edge frame members forwardly of said rear edge, said side and rear edge frame members and said connecting members being of hollow section to impart strength and connected together through extensions of certain of the elements of said hollow section, the inner portions of the side and rear edge frame members and the tops of the spaced connecting members being offset downwardly with respect to the outer portions of the side and rear edge frame members, and a metallic netting secured at its periphery in said offset portions of the edge frame members and at spaced points to said connecting frame members by spot welding, the netting being spaced from the edge frame and connecting members for the most part between welding points by sound deadening padding.

5. A roof structure for a central roof unit comprising a sheet metal frame including an edge member extending continuously around the sides and back thereof, the sides of said edge member being additionally interconnected by spaced sheet metal cross members of hollow section, said edge member being of generally angular cross section and having an upper outwardly extending single ply arm adapted to overlap an adjacent portion of the roof and a vertically extending web portion, said vertically extending portion being formed in its upper portion with the relatively deep narrow outwardly facing channel for the reception of a tacking strip, the top of said channel continuing the outwardly extending arm inwardly in downwardly offset relation, and the spaced cross members having end portions overlapping and secured to the top wall of the channel of said edge member, a tacking strip seated and secured in said channel, and a roof cover having its margin stretched over said outwardly extending arm and its edge extended inwardly in overlapping relation with the outside of said tacking strip and secured thereto.

JOSEPH LEDWINKA.